(12) United States Patent
White

(10) Patent No.: US 11,235,864 B2
(45) Date of Patent: Feb. 1, 2022

(54) LANDING GEAR

(71) Applicant: Airbus Operations Limited, Bristol (GB)

(72) Inventor: Nick White, Bristol (GB)

(73) Assignee: Airbus Operations Limited, Bristol (GB)

( * ) Notice: Subject to any disclaimer, the term of this patent is extended or adjusted under 35 U.S.C. 154(b) by 177 days.

(21) Appl. No.: 16/667,181

(22) Filed: Oct. 29, 2019

(65) Prior Publication Data
US 2020/0130817 A1    Apr. 30, 2020

(30) Foreign Application Priority Data
Oct. 30, 2018   (GB) ...................................... 1817731

(51) Int. Cl.
*B64C 25/14*    (2006.01)
*B64C 25/20*    (2006.01)

(52) U.S. Cl.
CPC .............. *B64C 25/14* (2013.01); *B64C 25/20* (2013.01)

(58) Field of Classification Search
CPC ......... B64C 25/20; B64C 25/14; B64C 25/10; B64C 25/12
See application file for complete search history.

(56) References Cited

U.S. PATENT DOCUMENTS 2,859,006 A    11/1958  Rene
8,070,094 B2 *  12/2011  Collins .................... B64C 25/12
                                                244/102 A
8,523,106 B2    9/2013   Thompson et al.
9,555,877 B2    1/2017   Schmidt
2010/0012779 A1  1/2010   Collins
2015/0175255 A1* 6/2015   Guering .................. B64C 25/26
                                                244/102 A
2018/0281934 A1  10/2018  Guering et al.

FOREIGN PATENT DOCUMENTS

| FR | 3 064 596 A1 | 10/2018 |
| GB |   626280 A   | 7/1949  |
| GB |  2495999 A   | 5/2013  |
| GB |  2563826     | 1/2019  |
| NZ |   582291 A   | 9/2010  |

OTHER PUBLICATIONS

European Search Report for Application No. 19206100.0 dated Mar. 19, 2020.
British Search Report for Application No. GB1817731.1 dated May 1, 2019.

* cited by examiner

*Primary Examiner* — Brian M O'Hara
(74) *Attorney, Agent, or Firm* — Jenkins, Wilson, Taylor & Hunt, P.A.

(57) ABSTRACT

A retractable landing gear assembly for an aircraft includes a leg mounted to airframe structure for rotation about a pivot axis. A stay assembly is provided for maintaining the landing gear assembly in a deployed, for example down and unlocked, configuration. The stay assembly has a linkage mechanism including a first stay and a second stay movable between a folded state and an unfolded state. Room that would otherwise be occupied within a landing gear bay may be freed up above the landing gear leg when in a stowed configuration by the stay assembly being unfolded but generally aligned with the length of the landing gear leg, with the stay assembly being mostly positioned beneath the leg.

13 Claims, 15 Drawing Sheets

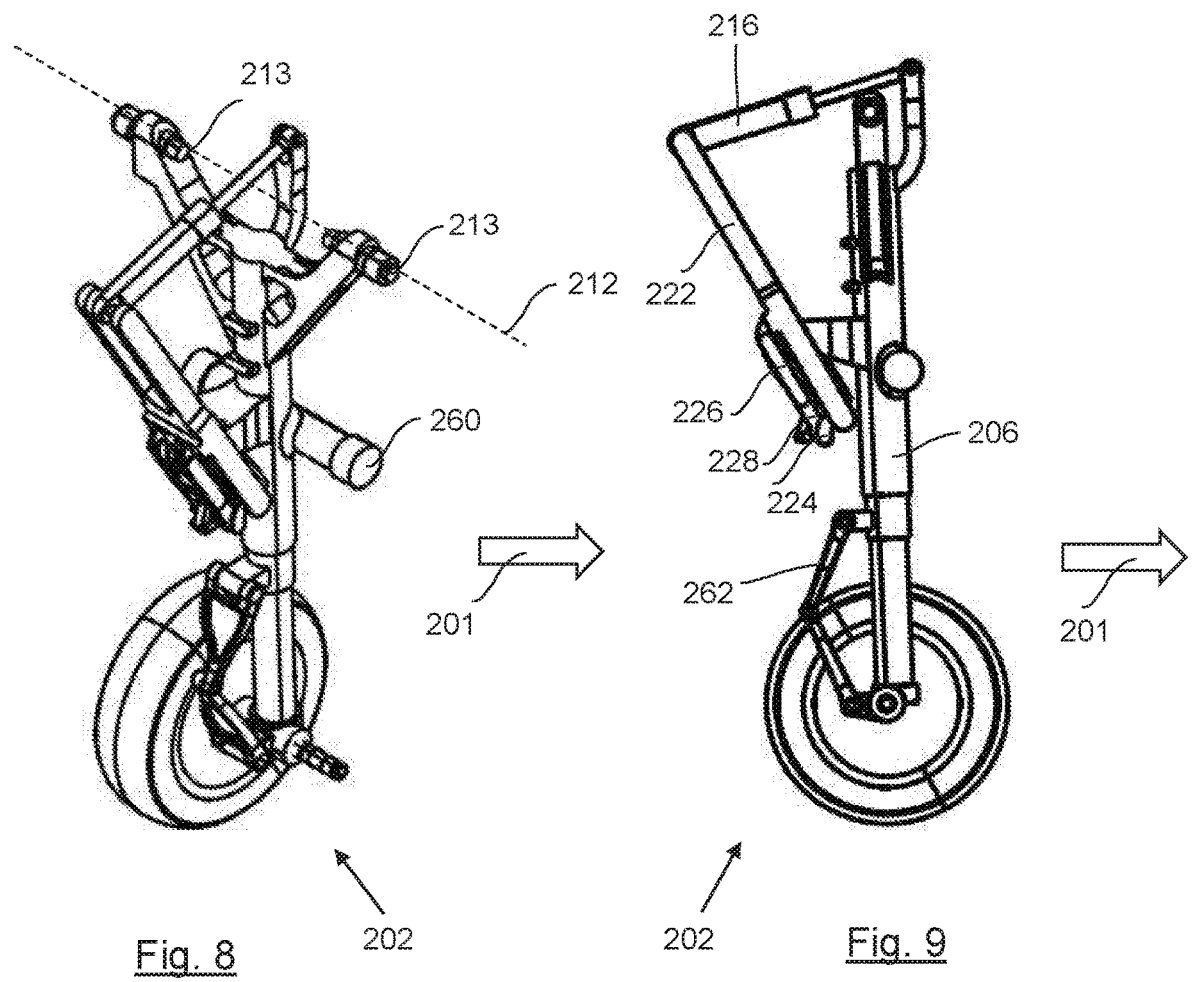

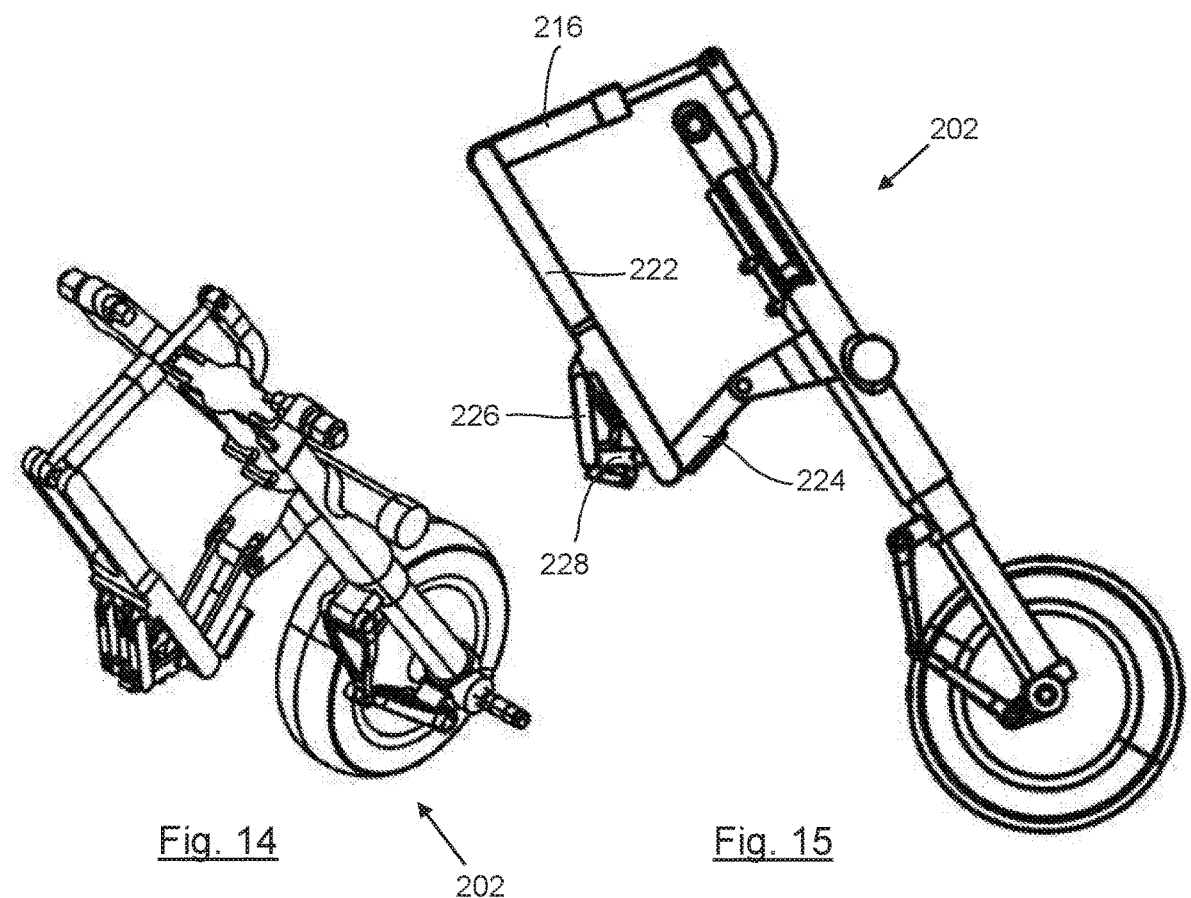

ially, nose landing gear assemblies will have a leg, which is arranged to rotate about a pivot between a deployed configuration for supporting the aircraft on the ground and a stowed configuration in the nose landing gear bay. To restrain the leg and prevent the nose landing gear assembly from collapsing when the aircraft is on the ground or being pushed back when the aircraft is in the air by aerodynamic forces, conventional nose landing gear commonly have a stay assembly, for example, a drag stay assembly. The stay assembly is normally attached at one end to the aircraft at a point substantially forward and above the nose landing gear assembly and at the other to a point on the nose landing gear leg. Stay assemblies are typically provided with a locking arrangement which allows the stay to be locked in position, when the leg is deployed, thus preventing the landing gear from being rotated up.

LANDING GEAR

CROSS-REFERENCE TO RELATED APPLICATION

This application claims priority to GB 1817731.1 filed Oct. 30, 2018, the entire disclosure of which is incorporated by reference herein.

TECHNICAL FIELD

The present disclosure relates to a landing gear arrangement. More particularly, but not exclusively, the disclosure herein concerns a landing gear assembly for an aircraft, for example a nose landing gear arrangement, including a space-efficient stay assembly/mechanism. The disclosure herein also concerns a method of retracting and/or deploying a landing gear leg. The term landing gear may be referred to herein by the abbreviation LG.

BACKGROUND

A nose landing gear of an aircraft is generally stored within a volume within the forward section of the aircraft fuselage so as to reduce aerodynamic effects that might penalize the performance of the aircraft. The area around the nose landing gear is typically referred to as the nose landing gear bay. It is also often the case that the available volume within the forward section of the aircraft contains various electronic assemblies, including avionics, radar equipment, and the flight deck. The shape of the nose fuselage influences the performance of the aircraft. If the volume of equipment required to be stored within the nose fuselage is minimized then there is more flexibility to produce a more efficient shape for that fuselage and improve aircraft performance. Also, the walls of the nose landing gear bay are subject to pressurisation and need to be reinforced to contain that pressure. If the pressurised surface area and nose landing gear bay is reduced, then so is the reinforcement needed and hence the mass of the nose landing gear bay.

Typically, nose landing gear assemblies will have a leg, which is arranged to rotate about a pivot between a deployed configuration for supporting the aircraft on the ground and a stowed configuration in the nose landing gear bay. To restrain the leg and prevent the nose landing gear assembly from collapsing when the aircraft is on the ground or being pushed back when the aircraft is in the air by aerodynamic forces, conventional nose landing gear commonly have a stay assembly, for example, a drag stay assembly. The stay assembly is normally attached at one end to the aircraft at a point substantially forward and above the nose landing gear assembly and at the other to a point on the nose landing gear leg. Stay assemblies are typically provided with a locking arrangement which allows the stay to be locked in position, when the leg is deployed, thus preventing the landing gear from being rotated up.

In certain aircraft (for example, the Airbus A310) the drag stay for the nose LG assembly is a telescopic component. Telescopic drag stays have an advantage of being lightweight and compact and allowing for simple kinematics, but have potential disadvantages. For example, much of the mechanism of the drag stay is internal and hidden from view, which complicates inspection and maintenance of the landing gear assembly.

In other aircraft of the prior art, the stay assembly comprises an upper and lower stay member which are arranged to rotate relative to each other about a central hinge. In a conventional arrangement using a hinged stay assembly, when the nose landing gear is rotated up inside the LG bay, the stay assembly is folded and positioned above the LG leg. This increases the nose landing gear bay volume required due to the additional height required within the nose landing gear bay to enclose the folded stay assembly. U.S. Pat. No. 8,523,106 proposes an arrangement in which the stay assembly can be folded either side (laterally) of the landing gear leg when stowed.

Other prior art of background interest is disclosed in U.S. Pat. Nos. 8,070,094 and 9,555,877.

The disclosure herein seeks to mitigate one or more of the above-mentioned problems. Alternatively or additionally, the disclosure herein seeks to provide an improved landing gear arrangement.

SUMMARY

The disclosure herein provides, according to a first aspect, a landing gear assembly for an aircraft, the landing gear assembly comprising a landing gear leg configured for rotation about a pivot axis. The landing gear leg may have one or more portions configured for mounting on airframe structure of an aircraft for rotation about such a pivot axis. The pivot axis may be such that it can be considered alternatively as a hinge axis. Such one or more portions may, in use, form at least part of a pivot joint directly on the airframe. The landing gear assembly is moveable between a deployed configuration and a stowed configuration. The landing gear assembly comprises a stay assembly, movable between various configurations. The stay assembly may have a first configuration (for example, an "up" configuration) when the landing gear assembly is in its stowed configuration. The stay assembly may have a second configuration (for example, a "down and locked" configuration) when the landing gear assembly is in its deployed configuration, in which for example the stay assembly restricts, or prevents, movement of the landing gear assembly away from its deployed configuration. The stay assembly may have a third configuration (for example, a "down and unlocked" configuration), in which for example the stay assembly permits movement of the landing gear assembly away from its deployed configuration. The stay assembly may have a first stay (for example a long stay) and a second stay (for example a short stay). Together the first and second stays may form a linkage mechanism movable between a folded state and an unfolded state, for example via one or more intermediate states. In the folded state, the first and second stays may be arranged in a folded arrangement, each stay being generally in-line with the other. For example, the length of one stay may be substantially aligned, or parallel with, the other stay. The length of one stay may be angled to the length of another stay, when viewed side-on (i.e. parallel to the axis of folding), by an angle of less than ten degrees when the side stays are in their folded state. When the linkage mechanism is in the unfolded state, the first and second stays may be arranged in an unfolded arrangement, the stays being generally in-line with each other. When the stay assembly is in an intermediate state, the first and second stays may be transversely arranged to each other (that is, for example, not in line with each other). It may be that the linkage mechanism of the stay assembly is in its folded state when the stay assembly is in its first (e.g. "up") configuration and the linkage mechanism is in its unfolded state when the stay assembly is in its second configuration (e.g. "down and locked"). Alternatively (or possibly additionally), it may be that the linkage mechanism of the stay assembly is in its unfolded state when the stay assembly is in its first configuration and the linkage mechanism is in its folded state when the stay assembly is in its second configuration. In either case, embodiments of either arrangement may make better use of the space in the aircraft than might otherwise be available.

The landing gear leg may have one or more wheel axles arranged at its lower end. The landing gear leg may, or may not, be supplied with wheels attached; for example when supplied before final assembly of an aircraft. The landing gear leg may be configured to be the main load bearing member between the wheel(s) and the airframe.

It may be that when the landing gear assembly is in its stowed position, the leg is positioned to one side of the pivot axis (of the leg) and at least a part of the linkage mechanism extends to the other side of the pivot axis. Such an arrangement may mean that the overall length of the landing gear assembly in its stowed position is longer than might otherwise be the case, but nevertheless enabling better use of space in the aircraft.

It may be that the linkage mechanism is in its unfolded state when the stay assembly is in the first (e.g. "up") configuration. Such an arrangement may mean that the overall length of the stay assembly, when the landing gear is stowed, is longer than might otherwise be the case, but nevertheless enabling better use of space in the aircraft.

It may be that when the landing gear assembly is in its stowed position, the majority (for example, substantially all) of the stay assembly is located beneath (e.g. vertically below) the landing gear leg. Such an arrangement may provide for better use of space in the aircraft than would otherwise be the case, if the stay assembly is positioned above the leg, for example.

It may be that the landing gear assembly is configured to move from the deployed configuration to the stowed configuration by the leg moving in a direction pointing away from the stay assembly. In the case where the landing gear assembly is a nose landing gear assembly, the landing gear assembly may be configured to move from the deployed configuration to the stowed configuration by folding forward (for example, with the wheel of the gear initially moving towards the front of the aircraft).

The stay assembly may comprise one or more actuator mechanisms. An actuator mechanism may be provided to assist in deploying the landing gear assembly. An actuator mechanism may be provided to assist in stowing the landing gear assembly. There may be at least one actuator provided and arranged in such a way that it has sufficient power to lift the weight of the landing gear. Such an actuator may be provided as part of the landing gear main actuator mechanism. It may be that the landing gear main actuator mechanism and the stay assembly are configured to attach to the same attachment point on the airframe of the aircraft. For example, the actuator and first stay may attach directly to the same attachment point on the airframe.

The first stay may be longer than the second stay. The first stay may be longer than 150% of the length of the second stay. The first stay may be more than twice as long as the second stay. The first stay may be rotatably connected to the second stay. The second stay may be rotatably connected to the landing gear leg. The linkage mechanism of the stay assembly may extend from one end at an attachment point on the airframe of the aircraft to an opposite end where it attaches to the leg. It may be that the linkage mechanism comprises a third link or stay, but it is preferred for it to have only two stay members, being the first stay and the second stay.

It may be that the attachment point of the stay assembly to the aircraft defines an axis of rotation that is parallel to the axis of rotation defined by the attachment point of the stay assembly to the leg. It may also be that both such axes normally lie parallel to the main axis of rotation the of the leg.

The linkage mechanism of the stay assembly may be configured to move to an over-center position as the stay assembly moves from the third (e.g. down and unlocked) configuration to the second (e.g. down and locked) configuration. In certain embodiments of the disclosure herein, having an arrangement where the stay assembly adopts an over-center configuration when the landing gear is down and locked can assist in the stay assembly being able to securely react dynamic loads without risk of moving out of position. Alternatively, or additionally, the linkage mechanism of the stay assembly may be configured to move to an over-center position as the stay assembly moves from the third (e.g. down and unlocked) configuration to the first (e.g. up) configuration. In certain embodiments of the disclosure herein, having an arrangement where the stay assembly adopts an over-center configuration when the landing gear is up and stowed can assist in the stay assembly being stowed securely in position. There may be no need for a separate or additional independent up-lock mechanism for example.

The stay assembly may comprise an unlock actuator. For example, the unlock actuator may be arranged to lock the stay assembly when in the second (e.g. down and locked) configuration to restrict or prevent movement of the stay assembly from that configuration. An unlock actuator may be arranged to unlock the stay assembly when in the second (e.g. down and locked) configuration to permit movement of the stay assembly from that configuration. The stay assembly may include a further link mechanism, for example having first and second links, for example brace links. The further link mechanism may be so arranged that it connects a part of the short stay to a part of the long stay. The further link mechanism may be configured to have an over-center state in which it locks the stay assembly in at least one of its folded state and its unfolded state. The link mechanism may be associated with an unlock actuator. For example, the unlock actuator may be arranged to move the further link mechanism from its over-center state, thus allowing the stay assembly to be moved from a locked position. The unlock actuator may be arranged (for example, additionally arranged) to lock the stay assembly when the landing gear is stowed, thus restricting or preventing movement of the stay assembly from its first (e.g. up) configuration. An unlock actuator (for example the same unlock actuator) may be arranged to unlock the stay assembly when in the first (e.g. up) configuration to permit movement of the stay assembly from that configuration. The above-mentioned further link mechanism of the stay assembly may be associated with an unlock actuator to lock/unlock the stay assembly in/from an up-and-locked configuration.

The stay assembly may comprise a stop (for example provided on, or integrally formed with, the short stay) which is arranged, in use, to stop the stay assembly from moving beyond an extreme position, for example at a position being at the extreme end of its motion in normal use. The extreme position may correspond to the position of the stay assembly when in its folded state. The extreme position may correspond to the position of the stay assembly when in its unfolded state. It may be that there is at least one stop which is arranged, in use, to stop the stay assembly from moving both beyond to the position of the stay assembly when in its folded state and beyond to the position of the stay assembly when in its unfolded state. The stop may be arranged to abut against a portion of the stay assembly to perform its stop function.

Embodiments of the disclosure herein provide particular benefit when the landing gear assembly is a nose landing gear assembly. Benefits of the disclosure herein may also be provided however when the landing gear assembly is not a nose landing gear assembly, for example when the landing gear assembly is one of the main landing gear arrangements and/or a wing-mounted landing gear arrangement.

It is preferred that the main structure of the leg of the landing gear assembly is of the non-folding type (i.e. not being provided with an upper section and a lower section being hinged about a knee joint). The leg may comprise a telescopic shock absorbing mechanism. As a result the leg may be longer, when stowed, than equivalent folding types and/or result in a less massive landing gear assembly overall.

According to a second aspect of the disclosure herein there is provided a nose landing gear arrangement comprising a landing gear leg having a wheel axle at one end and a mounting fixture at the other end for mounting the leg directly to airframe structure of the aircraft, there being a folding stay mechanism (a) which is folded and located behind the leg when the leg is deployed and (b) which is extended (e.g. unfolded) and located underneath (e.g. vertically below) the leg when the leg is stowed. In embodiments of this second aspect, it may be that at least part of the stay mechanism extends rearwardly of the mounting fixture of the leg when the leg is stowed. The nose gear landing arrangement may include an actuator for retracting the landing gear leg, the actuator and the folding stay mechanism being so configured to be attached to the airframe of the aircraft at a common attachment point. Having a common attachment point may allow the airframe to be designed in a structurally efficient manner.

According to a third aspect of the disclosure herein there is provided an aircraft comprising a landing gear assembly according to the first aspect and/or a nose landing gear arrangement according to the second aspect. The aircraft may be a passenger aircraft, for example an aircraft configured to carry more than 50 passengers, for example more than 100 passengers (or an equivalently sized aircraft for other purposes). The aircraft may have any of the essential and/or optional features of any aspect of the disclosure herein as described or claimed herein.

According to a fourth aspect of the disclosure herein there is provided a method of retracting a landing gear leg, for example after take-off of an aircraft, the aircraft for example being one in accordance with the third aspect of the disclosure herein. The method may comprise a step of using one or more actuators to unlock a stay assembly. The method may comprise a step of using one or more actuators to move a first link of the stay assembly to cause rotation of the leg about an axis of rotation provided by a portion of the airframe of the aircraft, until the leg is stowed. The first link may be rotatably attached to a second link of the stay assembly. The first and second links may move between a completely folded position being substantially in line with the rest of the stay assembly and a completely unfolded position also being substantially in line with the rest of the stay assembly, as the landing gear leg is rotated in a single direction (e.g. clockwise or anti clockwise, depending on the direction of viewing) towards its stowed position.

According to a fifth aspect of the disclosure herein there is provided a method of deploying a landing gear leg, for example after take-off of an aircraft, the aircraft for example being one in accordance with the third aspect of the disclosure herein. The method may comprise a step of an actuator acting on a first link of a stay assembly to cause rotation of the leg about an axis of rotation provided by a portion of the airframe of the aircraft, until the leg is deployed. It may be that the leg is arranged to deploy at least partially under the influence of gravity. It will therefore be understood that the actuator may positively act on the first link of the stay assembly to cause rotation of the leg for only part of the movement of the leg from the stowed position to the deployed position. It may be that the leg is arranged to deploy wholly under the influence of gravity, as a fail-safe mode. The method may comprise a step of locking the stay assembly with the leg in its deployed position. The first and second links of the stay assembly may move between a completely folded position being substantially in line with the rest of the stay assembly and a completely unfolded position also being substantially in line with the rest of the stay assembly, as the landing gear leg is rotated in a single direction (e.g. clockwise or anti clockwise, depending on the direction of viewing) towards its deployed position.

During performance of the method of either the fourth aspect or the fifth aspect, the leg and stay assembly may be stowed in a space-efficient manner, as will now be explained. The leg has a longitudinal axis that, when the leg is stowed, is angled to a horizontal plane by a first angle. The first and second links of the stay assembly, when the leg is stowed, are angled to the horizontal plane by a second angle and a third angle, respectively. Two or three of the first, second and third angles may be substantially identical, so that the leg and links of the stay assembly are all aligned with each other when the leg is stowed. The leg and links of the stay assembly may be generally aligned with each other, when the leg is stowed, for example so that the biggest difference between the first, second and third angles is less than 20 degrees. The leg and links of the stay assembly may be positioned so as to be substantially alongside each other when the leg is stowed. The links of the stay assembly may be positioned so as to be arranged generally in line and in series with each other when the leg is stowed. It may be that the leg and links of the stay assembly are all aligned with each other when the leg is deployed. The leg and links of the stay assembly may be generally aligned with each other, when the leg is deployed, for example so that they are all generally aligned with each other within a margin of +/−10 degrees (i.e. within 20 degrees). The leg and links of the stay assembly may be positioned so as to be substantially alongside each other when the leg is deployed. The links of the stay assembly may be positioned so as to be arranged generally in line and in series with each other when the leg is deployed.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which:

FIGS. 8 through 11 are various views of a nose landing gear assembly of a second embodiment in a down and locked configuration;

FIGS. 14 and 15 show the nose landing gear assembly of the second embodiment in an intermediate configuration being between the down and unlocked configuration of FIGS. 12 and 13 and a stowed configuration;

DETAILED DESCRIPTION

Figure 1:
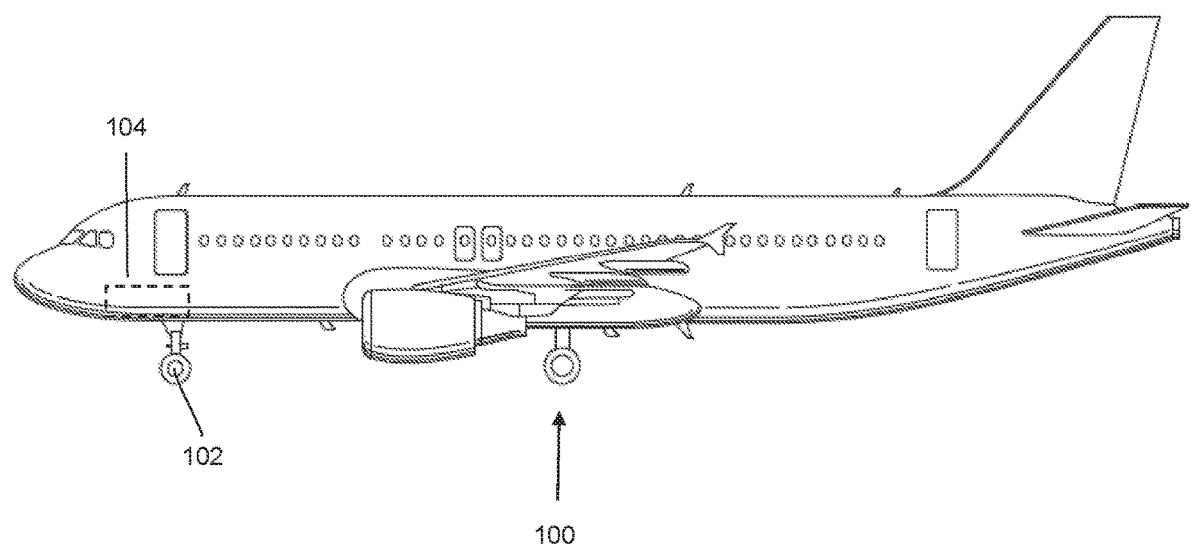
FIG. 1 is a side view of an aircraft of a type suitable for use with embodiments of the disclosure herein.

Embodiments of the disclosure herein concern the configuration and arrangement of a landing gear ("LG") for an aircraft and how such a landing gear is deployed and stowed. FIG. 1 shows an aircraft 100 of a type suitable for use with embodiments of the disclosure herein. The aircraft has a nose landing gear 102, which is shown in the deployed position in FIG. 1. The aircraft has a nose landing gear bay 104 shown schematically in broken line in FIG. 1.

Figure 2:
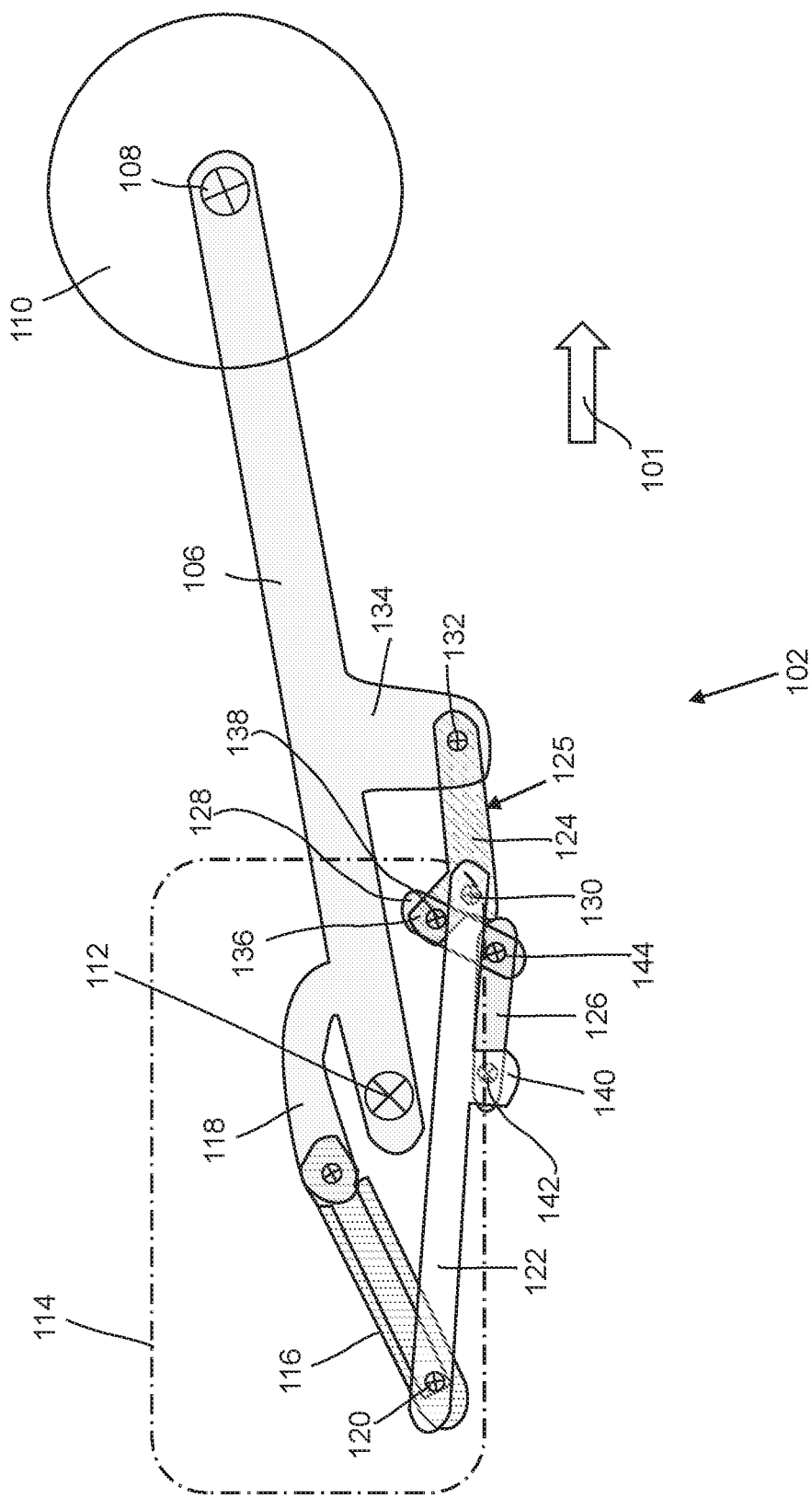
FIG. 2 is a side view of a nose landing gear assembly of a first embodiment, the landing gear being in a stowed position.

FIG. 2 shows the nose landing gear assembly 102 in a stowed position (the landing gear bay not being shown separately in FIG. 2). The forward direction is shown by arrow 101 in FIG. 2. The nose landing gear has a leg 106, at a lower end of which there is a wheel axle 108 on which a wheel 110 is mounted. The leg 106 is mounted for rotation about a pivot axis 112 which is fixed in relation to the airframe of the aircraft. In FIG. 2 the airframe of the aircraft is shown schematically by the dotted box 114. An actuator mechanism 116 is mounted at one end to an arm 118 integrally formed with the LG leg 106, and at the other end to a mounting point 120 fixed to the airframe. Extension of the actuator 116 causes rotation of the landing gear leg 106 about the axis 112 from the stowed position (shown in FIG. 2) to a deployed position, as illustrated by the sequence shown in FIGS. 2 through 7.

As shown in FIG. 2, the landing gear assembly 102 comprises a stay mechanism comprising a long stay 122 and a short stay 124. The landing gear assembly 102 also comprises an upper brace link 126 and a lower brace link 128. The long stay 122 is mounted for rotation at its upper end to the airframe mounting point 120 (and thus has an attachment and rotation mounting in common with the actuator mechanism 116). The long stay 122 is linked to the short stay 124 by a hinge joint 130. The short stay 124 connects to the landing gear leg 106 at a hinge joint 132 formed in a mounting bracket 134 integrally formed with the leg 106. Although not shown in FIG. 2, the short stay 124 includes a stop 125. The short stay 124 includes a pair of lugs 136 (only one of which being visible in FIG. 2), defining a hinge 138 to which the lower brace 128 is mounted. The long stay 122 includes an integrally formed mounting bracket 140 defining a hinge axis 142 to which the upper brace 126 is rotatably mounted. The upper 126 brace is connected to the lower brace 128 by hinge joint 144.

With reference to FIG. 2, it will be seen that the landing gear assembly 102 when stowed does not intrude greatly into the region above the landing gear leg 106. It will be seen that none of the mechanism is as high (in a vertical direction as shown in FIG. 2—showing the orientation when the aircraft longitudinal axis is horizontal) as the highest extend of the LG leg, even without the wheel attached). It will also be seen that only a very small minority of structure associated with the LG assembly extends above the plane defined by the axis of the leg (i.e. in FIG. 2, the structure above the infinite straight line that extends though the pivot axis 112 of the leg and the wheel axis 108. Instead, some of the mechanism associated with the landing gear assembly 102 extends to the left of the main hinge 112 (as viewed in FIG. 2), the leg and associated wheel sitting to the right of the hinge 112. The space available above the landing gear assembly 102 may thus be used for other purposes in the aircraft. For example, the nose landing gear bay may have a lower height than is typically the case. The space that is freed up may then be used for other purposes such as greater room in the cockpit and/or greater room for avionics equipment in the nose of the aircraft. The length of the leg 106 when stowed is generally aligned with both the long stay 122 and the short stay 124. It will be seen in FIG. 2, that the longitudinal axis of the leg (i.e. the axis along its length) is angled to the horizontal by about +10 degrees, the long stay is angled to the horizontal by about −5 degrees and the short stay is angled to the horizontal by slightly less than the main leg, so about +8 degrees. Within a margin of about 20 degrees, the leg, long stay and short stay are therefore in-line with each other—in this example, with the long stay and short stay being in an unfolded state.

Figure 3:
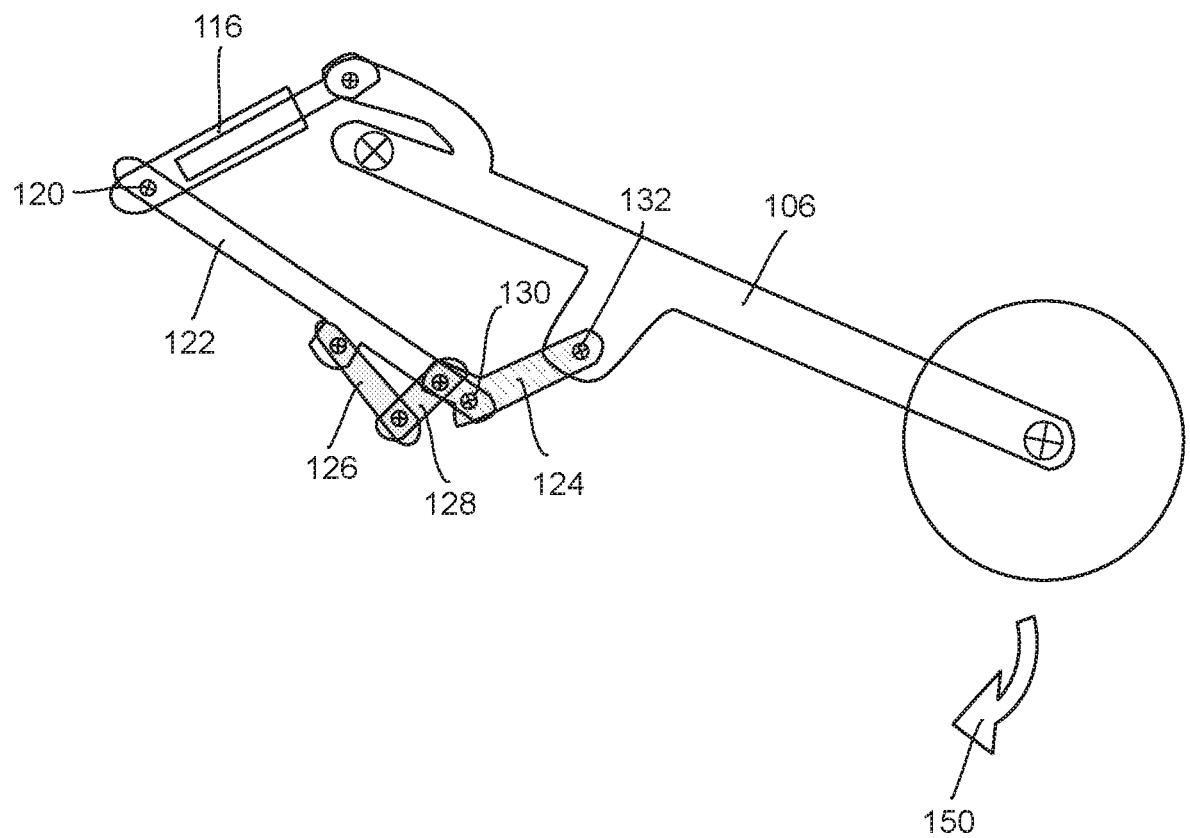
FIGS. 3 through 6 are successive views of the landing gear of the first embodiment showing movement of the landing gear from the stowed position of FIG. 2 towards a deployed position.
Figure 4:
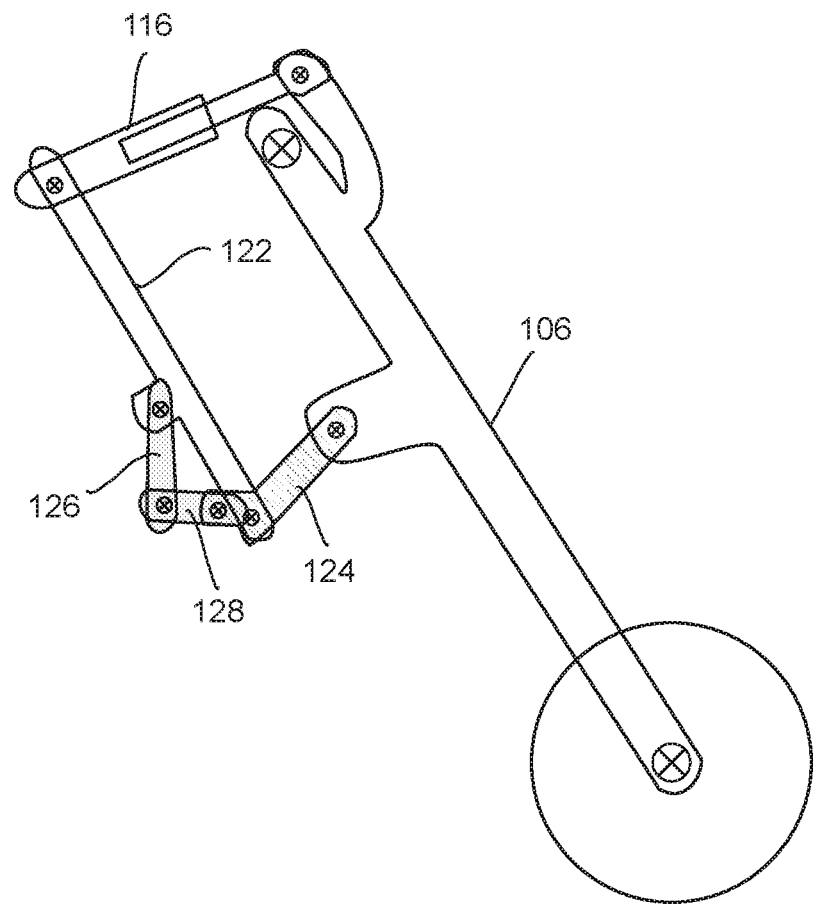
Figure 5:
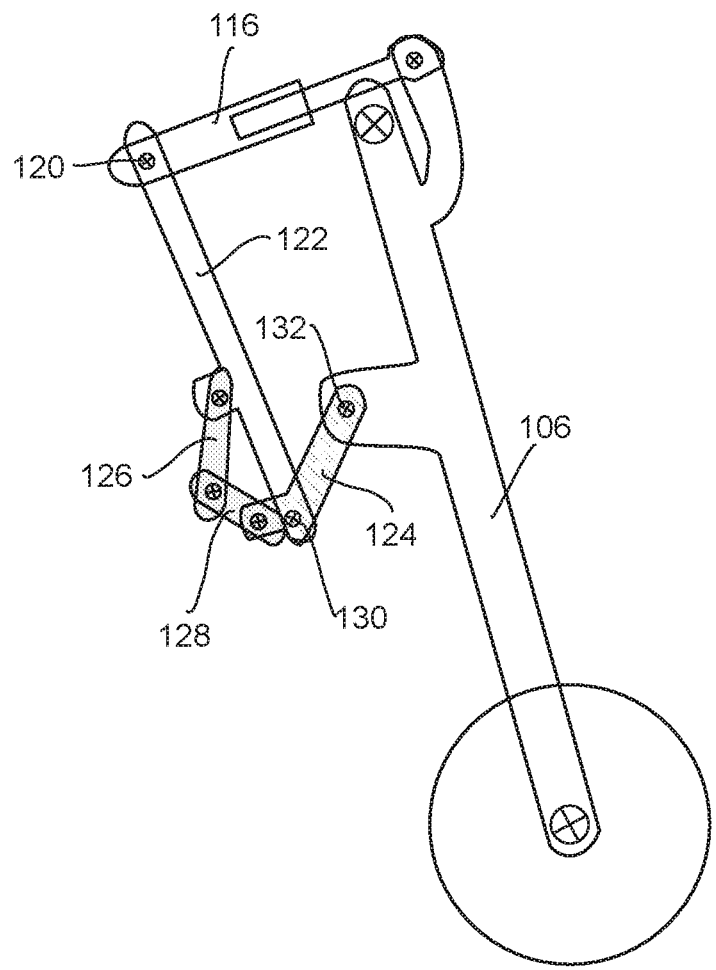
Figure 6:
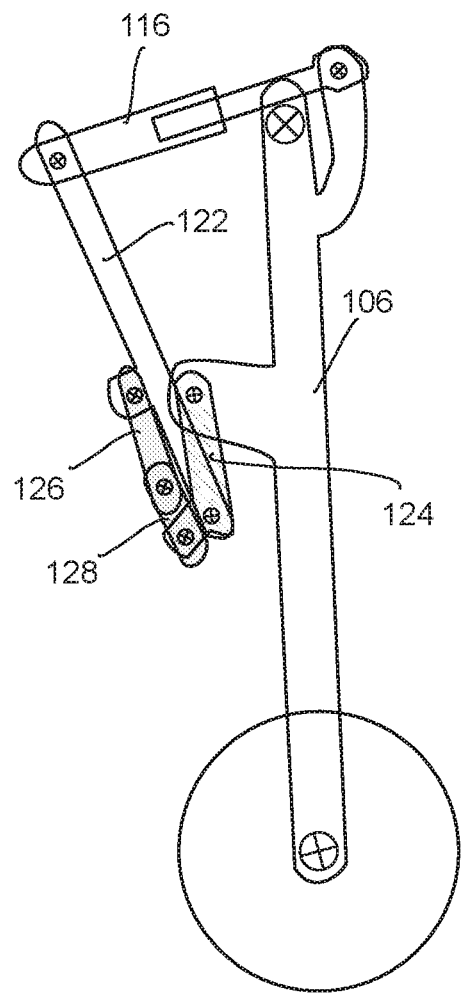

Deployment of the nose landing gear assembly of the first embodiment will now be described with reference to FIGS. 2 through 7. FIG. 2 shows the leg 106 in the stowed position, with the stay assembly in an unfolded state. The actuator mechanism 116 is instructed to extend causing the leg to rotate in a clockwise direction (as shown in FIGS. 2 through 7) as shown by the arrow 150 in FIG. 3. When deploying, the LG leg thus moves in a direction towards the stay assembly. (It will be understood that the LG leg therefore moves in a direction pointing away from the stay assembly when the landing gear assembly moves in the reverse direction—i.e. from the deployed configuration to the stowed configuration). FIGS. 4 through 6 show the leg progressively moving in a clockwise direction towards the fully deployed position shown in FIG. 7. FIGS. 3, 4, and 5, each show the stay assembly and brace assembly in intermediate positions between their positions when the landing gear is fully retracted (stowed) and when the landing gear is down and locked (i.e. fully deployed). In each of FIGS. 3, 4, and 5, the long stay 122 is arranged transverse to the short stay 124 (and not therefore aligned with each other). The length of the long stay may, in the view shown in FIGS. 3 through 5, be considered as being parallel to the notional straight line that coincides with both (a) its axis of rotation about the mounting point 120 and (b) the hinge axis 130 between the long stay and the short stay. Similarly, the length of the short stay may be considered as being parallel to the notional straight line that coincides both its axis of rotation about hinge joint 132 and the hinge axis 130 between the long stay and the short stay. Given that in each of FIGS. 3, 4, and 5, the long stay is arranged transverse to the short stay, and not therefore either completely unfolded (as in FIG. 2) and not completely folded (as in FIG. 7), the stay assembly may be considered as being in a series of intermediate transversely arranged states (e.g. partially folded or partially unfolded).

Figure 7:
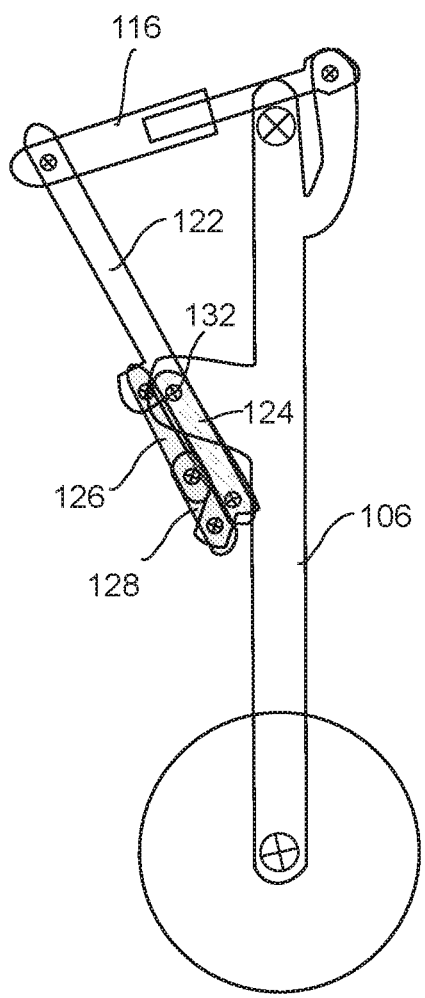
FIG. 7 shows the landing gear of the first embodiment in its deployed position.

It will be seen that when the leg has fully rotated to the deployed position, the long stay 122 is in line with the short stay 124 and also parallel with the upper and lower brace links 126, 128. The stop 125 of the short stay 124 engages with the long stay 122 and prevents the leg 106 from rotating further in the clockwise direction from the position shown in FIG. 7. The centerline of the long stay 122 has moved beyond the hinge axis 132 on the leg and is thus in an over center position when the leg is fully deployed. Also, the upper and lower braces have rotated to an over center position when they have reached the positions shown in FIG. 7. The landing gear stay assembly, comprising the short stay and long stay, may thus be locked in the over center position by a locking mechanism associated with the brace links 126, 128. A lock/unlock actuator may be provided to break the brace links out from their over-center position and therefore unlock the stay assembly and move it from its over center configuration. FIG. 7 shows the landing gear assembly in the down and locked configuration.

To summarize the first embodiment, a retractable landing gear assembly for an aircraft comprises a leg mounted to airframe structure for rotation about a pivot axis. A stay assembly is provided for maintaining the landing gear assembly in a deployed, for example down and unlocked, configuration. The stay assembly has a linkage mechanism comprising a first stay and a second stay which are movable between a folded state and an unfolded state. Room that would otherwise be occupied within a landing gear bay may be freed up above the landing gear leg when in a stowed configuration by the stay assembly being unfolded but generally aligned with the length of the landing gear leg, with the stay assembly being mostly positioned beneath (e.g. vertically below) the leg.

Figures 10, 11:
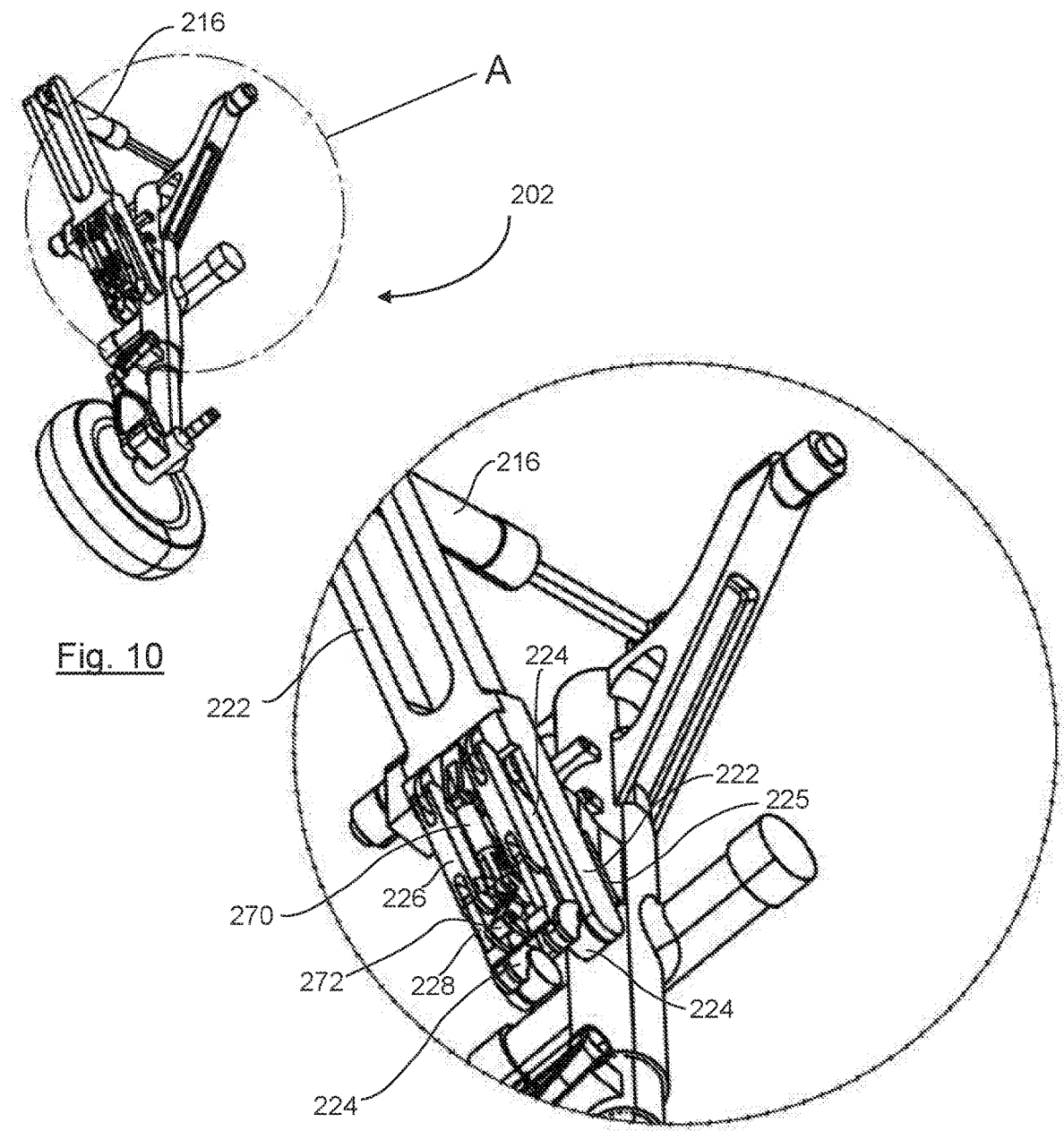

A second embodiment of the disclosure herein shown with reference to FIGS. 8 through 19, which show a nose landing gear assembly in various views and configurations will now be described. Similar reference numerals will be used for similar parts but with the prefix "2" instead of "1" (so that an item labelled with reference numerals 1nn in relation to the first embodiment will, in relation to the second embodiment, be referred to and labelled with the reference numeral 2nn if the items are similar). FIGS. 8, 9, 10, and 11 show a nose landing gear assembly in the down and locked position. The landing gear assembly 202 includes an actuator mechanism 216, a landing gear leg 206, a long stay 222, a short stay 224 and brace links 226, 228. Also shown in these figures are steering actuators 260 and a torque link assembly 262. The landing gear assembly is mounted for rotation about a hinge axis 212 by two respective pins 213 each being located on the airframe in the landing gear bay (not shown separately in FIGS. 8 through 15 or 17). The forward direction is shown in FIGS. 8 and 9 by arrow 201. It will be seen that the landing gear stay assembly is located generally rearwardly of the main leg 206 of the nose landing gear. FIG. 10 shows a perspective view of the landing gear assembly 202, the configuration corresponding to FIGS. 8 and 9. FIG. 11 shows a magnified view of the region labelled A in FIG. 10. With reference to FIG. 11, an unlock actuator 270 is mounted at one end to the long stay 222 and at the other end to a lock link arrangement 272 connected to the lower brace link 228. Lock springs are also provided (not clearly visible in FIG. 11) which act to urge the lock link arrangement and therefore the brace links 226, 228 into the over center and locked configuration.

Figures 12, 13:
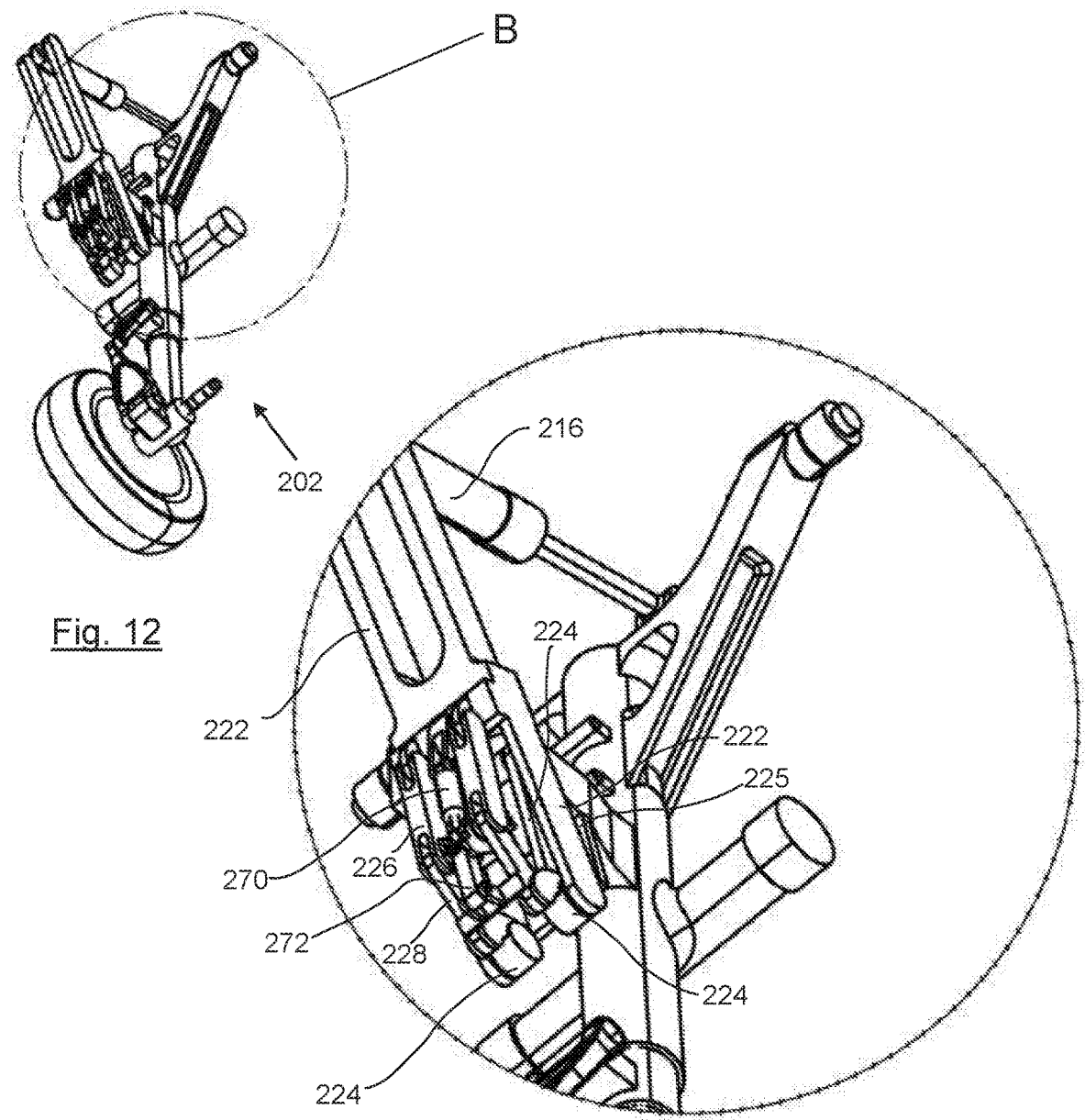
FIGS. 12 and 13 show the nose landing gear assembly of the second embodiment in a down and unlocked configuration.

FIGS. 12 and 13 correspond to the same views as shown in FIGS. 10 and 11 but showing the landing gear assembly in the down and unlocked configuration. Thus, FIG. 13 shows a magnified view of the region labelled B in FIG. 12. In order to move from the "down and locked" configuration to the "down and unlocked" configuration it is first necessary to actuate the unlock actuator to cause the brace links to move from the over center position. This then allows the long stay 212 also to move beyond its over center position back towards the positions shown in FIGS. 14 and 15.

Figure 16:
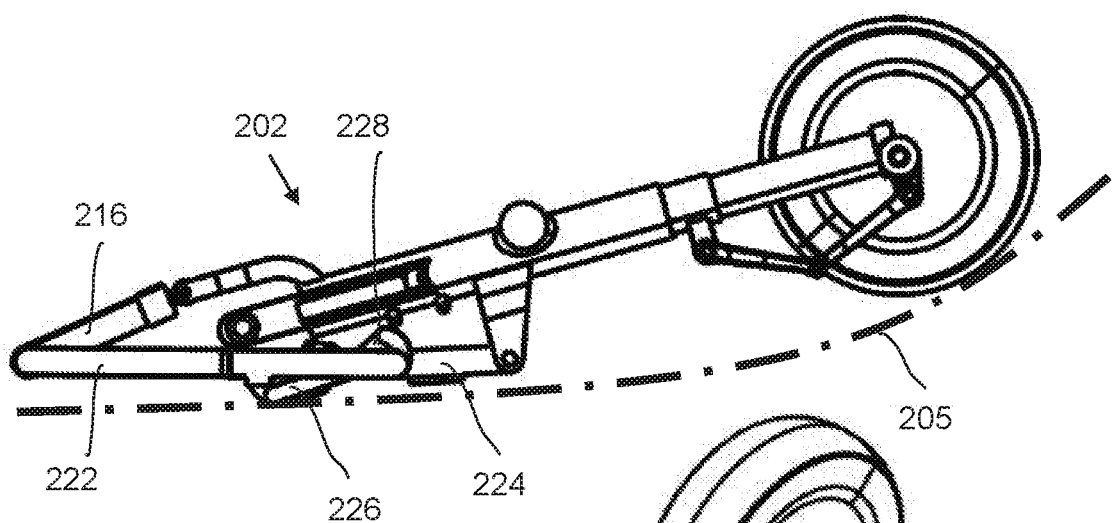
FIGS. 16 through 19 are various views of the landing gear of the second embodiment in the stowed configuration.
Figure 17:
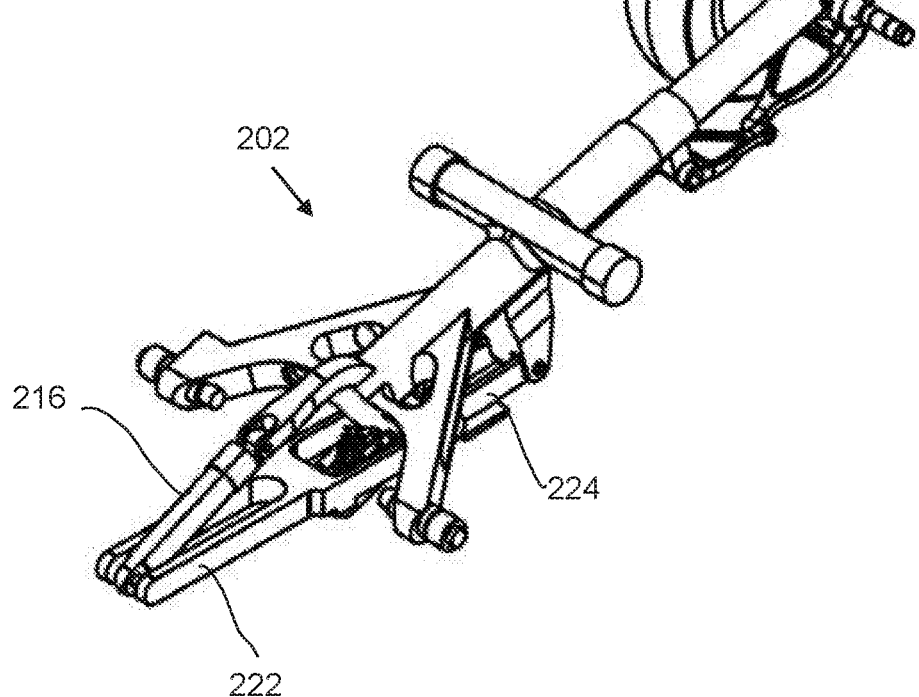
Figures 18, 19:
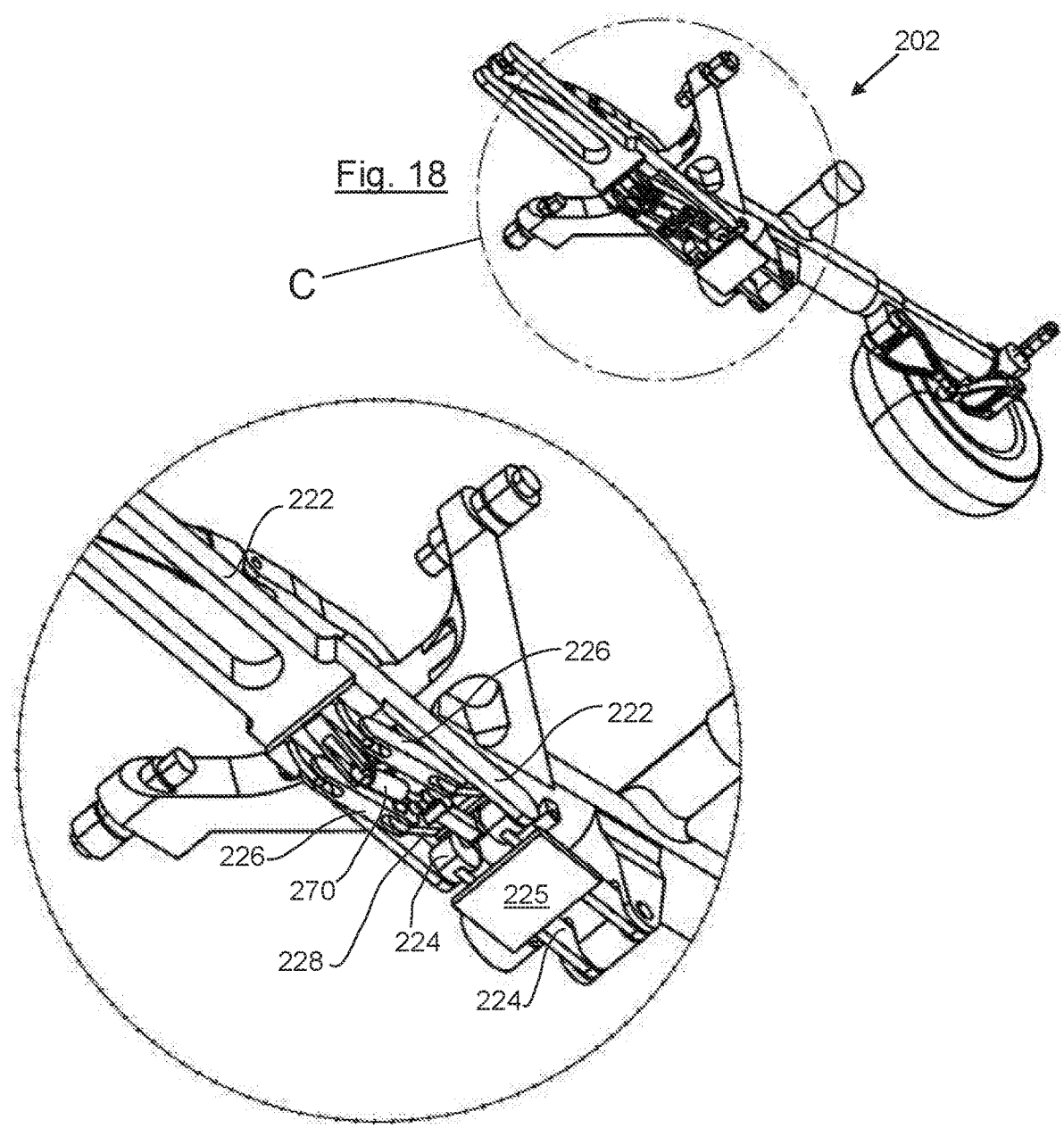

FIGS. 16, 17, 18 and 19 show the nose landing gear assembly 202 in the stowed configuration. FIG. 16 shows schematically in broken line 205 the lower surface of the nose landing gear bay, when the landing gear assembly is stowed. FIG. 19 shows a magnified view of the region labelled C in FIG. 18. FIG. 19 shows the stop plate 225 of the short stay 224. In the stowed configuration, the stop plate 225 does not perform a stopping function. In the configuration shown in FIG. 11 however the lateral edges of the upper surface of the stop plate 225 (i.e. the surface on the opposite side of the plate that is visible in FIG. 19) butt against the sides of the long stay 222. Only a very thin portion of the stop plate 225 is visible in FIG. 11. At the position at which the leg has rotated to the "up" and stowed position, the long stay 222 and short stay 224 have rotated to an over center position and the main actuator 216 is substantially fully retracted. In order for the leg to rotate back down to the deployed position, the long stay 222 and short stay 224 need to be rotated back from the over-center state, which in this embodiment is achieved with the use of the unlock actuator 270 and the lock link arrangement 272. Thus, the unlock actuator 270 and the lock link arrangement 272 may be considered as performing at least part of the function of an up lock system for securely retaining the LG leg in its stowed configuration.

Figure 20:
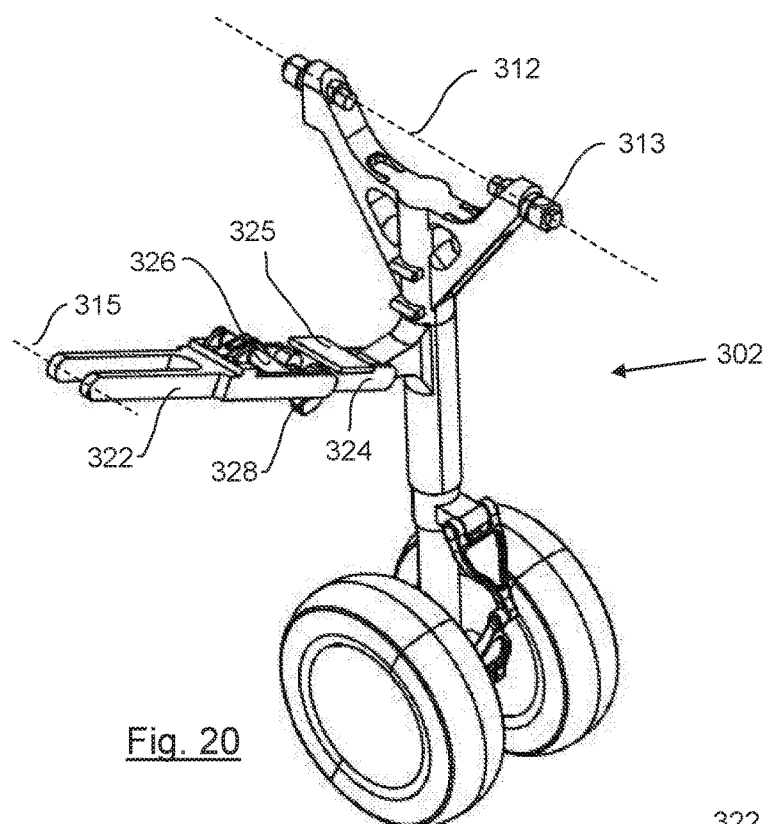
FIG. 20 is a perspective view of a wing-mounted landing gear of a third embodiment in a down and locked configuration.
Figure 21:
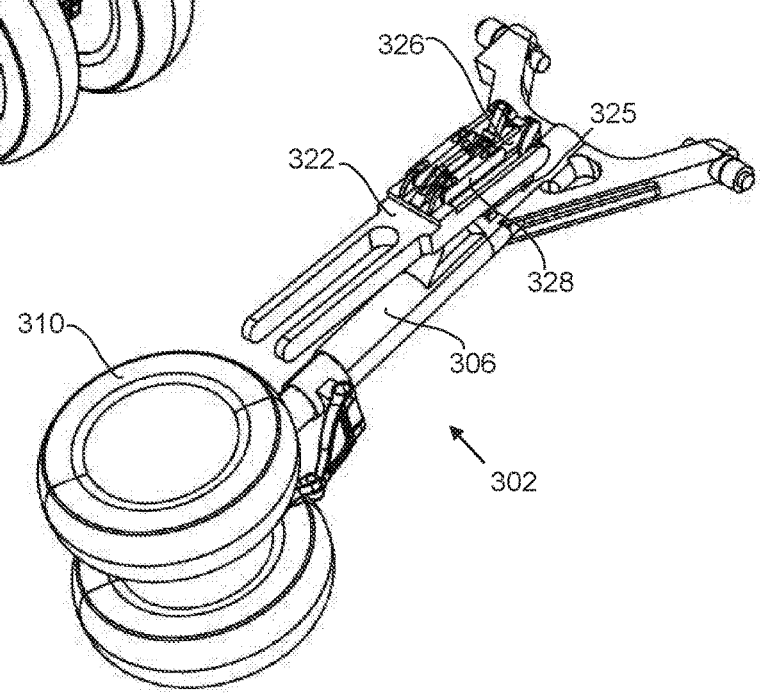
FIG. 21 is a perspective view of the wing-mounted landing gear of the third embodiment in a stowed configuration.

A third alternative embodiment is illustrated by FIGS. 20 and 21 and relates to the use of the various elements of the above-described embodiments in relation to a wing mounted landing gear 302. In this embodiment the leg is mounted to structure in the wing for rotation about an axis 312 by pins 313. The landing gear rotates about an axis that is generally aligned with the longitudinal axis of the aircraft and therefore folds in an inboard direction when moving from the deployed to the retracted configurations. The long stay 322 is mounted to airframe structure in the fuselage for rotation about a hinge axis 315—the airframe structure and pins being omitted from FIGS. 20 and 21. In this third embodiment, when the landing gear is deployed the short stay 324 and long stay 322 are in an unfolded state. When the landing gear is stowed (the wheels 310 being retained in the fuselage of the aircraft), the short stay 324 and the brace links 326, 328 are folded so that they are aligned with the long stay 322 and also generally aligned with the landing gear leg 306. The underside of the long stay 322 (as shown in FIG. 21) abuts with the upper surface (with reference to the positon shown in FIG. 21) of the stop plate 325 of the short stay 324 (only a very thin section of the stop plate 325 being visible in the position shown in FIG. 21).

Figure 22:
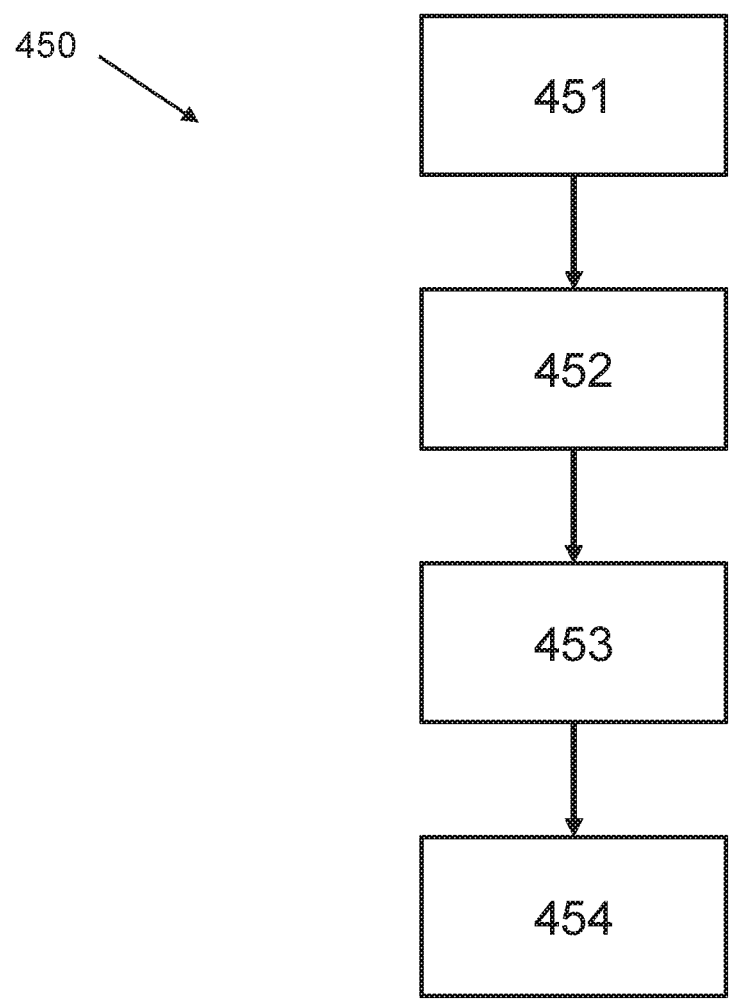
FIG. 22 is a flowchart of a method according to a fourth embodiment of the disclosure herein.

A fourth embodiment is shown by FIG. 22, which is a schematic flowchart illustrating the method of deploying/retracting the landing gear of, for example, the first embodiment described above. The initial state (box 451) of the landing gear is in the stowed configuration. The stay assembly in this configuration is in its unfolded state, with links of the stay assembly being generally aligned and in-line with each other. Then (box 452) the main actuator is activated causing the landing gear to move from the landing gear bay towards its deployed position. As the landing gear leg rotates about its hinge axis, the links of the stay assembly rotate relative to each other, moving into positions where the links are no longer aligned or in line with each other. The landing gear leg moves to a deployed, but unlocked, position (represented by box 453) and then to its locked and deployed configurations (represented by box 454). The process of retracting a locked and deployed landing gear can be considered as effectively performing the steps shown in FIG. 22 in reverse. It may however be necessary for the stay assembly of the landing gear to be unlocked by an unlock actuator provided for that purpose.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

The stay assembly need not be in an over-center arrangement when the LG leg is in the down and locked position and may instead be arranged with the links in a straight line, for example.

The stay assembly need not be attached to the same point on the airframe as the main actuator.

The term 'or' shall be interpreted as 'and/or' unless the context requires otherwise.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the disclosure herein. Moreover, it is to be understood that such optional integers or features, while of possible benefit in some embodiments of the disclosure herein, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nose landing gear assembly for an aircraft, the nose landing gear assembly comprising:
   a landing gear leg having a portion which defines a pivot axis and which is configured for mounting on an airframe structure of an aircraft for rotation about the pivot axis between a deployed configuration and a stowed configuration;
   a stay assembly, which is movable between various configurations and comprises:
      a first stay and a second stay, which together form a linkage mechanism that is configured to move from a folded state, in which the first stay and the second stay are in a folded arrangement and are generally in-line with each other, to an unfolded state;
   wherein the various configurations comprise:
      a first configuration when the nose landing gear assembly is in the stowed configuration;
      a second configuration when the nose landing gear assembly is in the deployed configuration; and
      a third configuration;
   wherein the stay assembly, when in the second configuration, is configured to restrict movement of the nose landing gear assembly from the deployed configuration
   wherein the stay assembly, when in the third configuration, is configured to permit movement of the nose landing gear assembly from the deployed configuration; and
   wherein:
      the linkage mechanism is in the folded state when the stay assembly is in the first configuration and is in the unfolded state when the stay assembly is in the second configuration; or
      the linkage mechanism is in the folded state when the stay assembly is in the second configuration and is in the unfolded state when the stay assembly is in the first configuration;
   wherein the nose landing gear assembly is configured such that, when in the stowed configuration, a majority of the stay assembly is located vertically below the landing gear leg;
   wherein, when the landing gear leg is in the stowed configuration, a longitudinal axis of the landing gear leg is angled relative to a horizontal plane by a first angle, the first stay of the stay assembly is angled relative to the horizontal plane by a second angle, and the second stay of the stay assembly is angled relative to the horizontal plane by a third angle;
   wherein a biggest difference between the first, second, and third angles is less than 20 degrees; and
   wherein, when the landing gear leg is in the deployed configuration, the landing gear leg and the first and second stays of the nose landing gear assembly are all substantially aligned with each other within a margin of 20 degrees.

2. The nose landing gear assembly according to claim 1, wherein the nose landing gear assembly is configured such that, when in the stowed configuration, the landing gear leg is positioned on a side of the pivot axis and at least a part of the linkage mechanism extends to another side of the pivot axis.

3. The nose landing gear assembly according to claim 1, wherein the linkage mechanism is in the unfolded state when the stay assembly is in the first configuration.

4. The nose landing gear assembly according to claim 1, wherein the landing gear assembly is configured to move from the deployed configuration to the stowed configuration by the landing gear leg moving in a direction pointing away from the stay assembly.

5. The nose landing gear assembly according to claim 1, wherein the stay assembly comprises an actuator mechanism for deploying and/or stowing the landing gear assembly.

6. The nose landing gear assembly according to claim 5, wherein the actuator mechanism and the first stay are configured to attach to a same attachment point on the airframe of the aircraft.

7. The nose landing gear assembly according to claim 1, wherein the linkage mechanism is configured to move to an over-center position as the stay assembly moves from the third configuration to the second configuration.

8. The nose landing gear assembly according to claim 1, wherein the linkage mechanism is configured to move to an over-center position as the stay assembly moves from the third configuration to the first configuration.

9. The nose landing gear assembly according to claim 1, wherein the first stay is a long stay and the second stay is a short stay, and the stay assembly comprises:
- an unlock actuator; and
- a further link mechanism comprising first and second links which connect a part of the short stay to a part of the long stay;
- the further link mechanism having an over-center state in which it locks the stay assembly in at least one of the folded state and the unfolded state; and
- wherein the unlock actuator is configured to move the further link mechanism from the over-center state, thus unlocking the stay assembly.

10. The nose landing gear assembly according to claim 1, wherein the stay assembly comprises a stop which is arranged abutted against a portion of the stay assembly to stop the stay assembly from moving beyond an extreme position corresponding to at least one of the folded state and the unfolded state.

11. An aircraft including the nose landing gear assembly according to claim 1.

12. A method of retracting a nose landing gear leg after take-off of an aircraft, the method comprising:
- providing a stay assembly comprising a first stay and a second stay, wherein the first stay is rotatably attached to the second stay and the first and second stays are movable between a folded position, in which the first stay and the second stay are in a folded arrangement and are substantially in-line with each other, and an unfolded position, in which the first stay and the second stay are in a folded arrangement and are substantially in-line with each other;
- unlocking, using one or more actuators, the stay assembly; and
- moving the first stay of the stay assembly to cause rotation of the landing gear leg about an axis of rotation, which is defined by a portion of an airframe of the aircraft, until the landing gear leg is in a stowed configuration;
- wherein the first and second stays move between the unfolded position and the folded position as the landing gear leg is rotated in a single direction towards the stowed configuration;
- wherein, when the landing gear leg is in the stowed configuration, a longitudinal axis of the landing gear leg is angled relative to a horizontal plane by a first angle, the first stay of the stay assembly is angled relative to the horizontal plane by a second angle, and the second stay of the stay assembly is angled relative to the horizontal plane by a third angle;
- wherein a biggest difference between the first, second, and third angles is less than 20 degrees;
- wherein, when the landing gear leg is in a deployed configuration, the landing gear leg and the first and second stays of the nose landing gear assembly are all substantially aligned with each other within a margin of 20 degrees; and
- wherein a majority of the stay assembly is located vertically below the landing gear leg when the landing gear leg is in the stowed configuration.

13. A method of deploying a nose landing gear leg before landing of an aircraft, the method comprising:
- providing a stay assembly for the landing gear leg, wherein the stay assembly comprises a first stay and a second stay, wherein the first stay is rotatably attached to the second stay and the first and second stays are movable between a folded position, in which the first stay and the second stay are in a folded arrangement and are substantially in-line with each other, and an unfolded position, in which the first stay and the second stay are in a folded arrangement and are substantially in-line with each other;
- moving, via an actuator, the first stay of the stay assembly to cause rotation of the landing gear leg about an axis of rotation, which is defined by a portion of an airframe of the aircraft, from the stowed position into a deployed configuration; and
- locking the stay assembly with the landing gear leg in the deployed configuration;
- wherein, when the landing gear leg is in a stowed configuration, a longitudinal axis of the landing gear leg is angled relative to a horizontal plane by a first angle, the first stay of the stay assembly is angled relative to the horizontal plane by a second angle, and the second stay of the stay assembly is angled relative to the horizontal plane by a third angle;
- wherein a biggest difference between the first, second, and third angles is less than 20 degrees;
- wherein a majority of the stay assembly is beneath the landing gear leg when the landing gear leg is in the stowed configuration;
- wherein the first and second stays move between the folded position and the unfolded position as the landing gear leg is rotated in a single direction towards the deployed configuration; and
- wherein, when the landing gear leg is in a deployed configuration, the landing gear leg and the first and second stays of the nose landing gear assembly are all substantially aligned with each other within a margin of 20 degrees.

* * * * *